United States Patent

[11] 3,627,969

| | | |
|---|---|---|
| [72] | Inventor | Heinz Finzer<br>Lindenmatte 16, Sackingen, Germany |
| [21] | Appl. No. | 43,362 |
| [22] | Filed | June 4, 1970 |
| [45] | Patented | Dec. 14, 1971 |
| [32] | Priority | June 12, 1969 |
| [33] | | Germany |
| [31] | | P 19 29 787.1 |

[54] WELDING DEVICE FOR ELECTRIC CONTACT ELEMENTS
7 Claims, 1 Drawing Fig.

[52] U.S. Cl. .................................................. 219/79, 219/80
[51] Int. Cl. ...................................................... B23k 9/12, B23k 11/00
[50] Field of Search ........................................... 219/79, 80, 85

[56] References Cited
UNITED STATES PATENTS

| | | | |
|---|---|---|---|
| 3,247,355 | 4/1966 | Olsen .......................... | 219/85 |
| 3,299,246 | 1/1967 | Wahl ............................ | 219/79 |
| 3,288,976 | 11/1966 | Sandret ........................ | 219/79 |
| 2,343,687 | 3/1944 | Martindell .................... | 219/79 |

Primary Examiner—R. F. Staubly
Assistant Examiner—Hugh D. Jaeger
Attorneys—Ronald L. Engel, Daniel W. Vittum, Jr., Gomer W. Walters and John A. Waters ABSTRACT: A welding device for electric contact elements comprises a vertically slidable feed electrode having a pellet uptake recession in the upper tip thereof. Positioned around the feed electrode is a pellet magazine containing welding pellets. At the lower limit of vertical travel of the feed electrode, the upper tip of the feed electrode is positioned relative to the pellet magazine to permit a welding pellet to fall into the pellet uptake recession. The welding pellet is then carried upwardly by the feed electrode until it reaches the upper limit of travel of the feed electrode where the pellet is pressed against support material held in place by a counter electrode. The pellet is then welded onto the support material. After completion of the welding operation, the feed electrode is moved vertically downward to permit uptake of another pellet, and the feed material is moved a predetermined distance to expose a new unwelded surface.

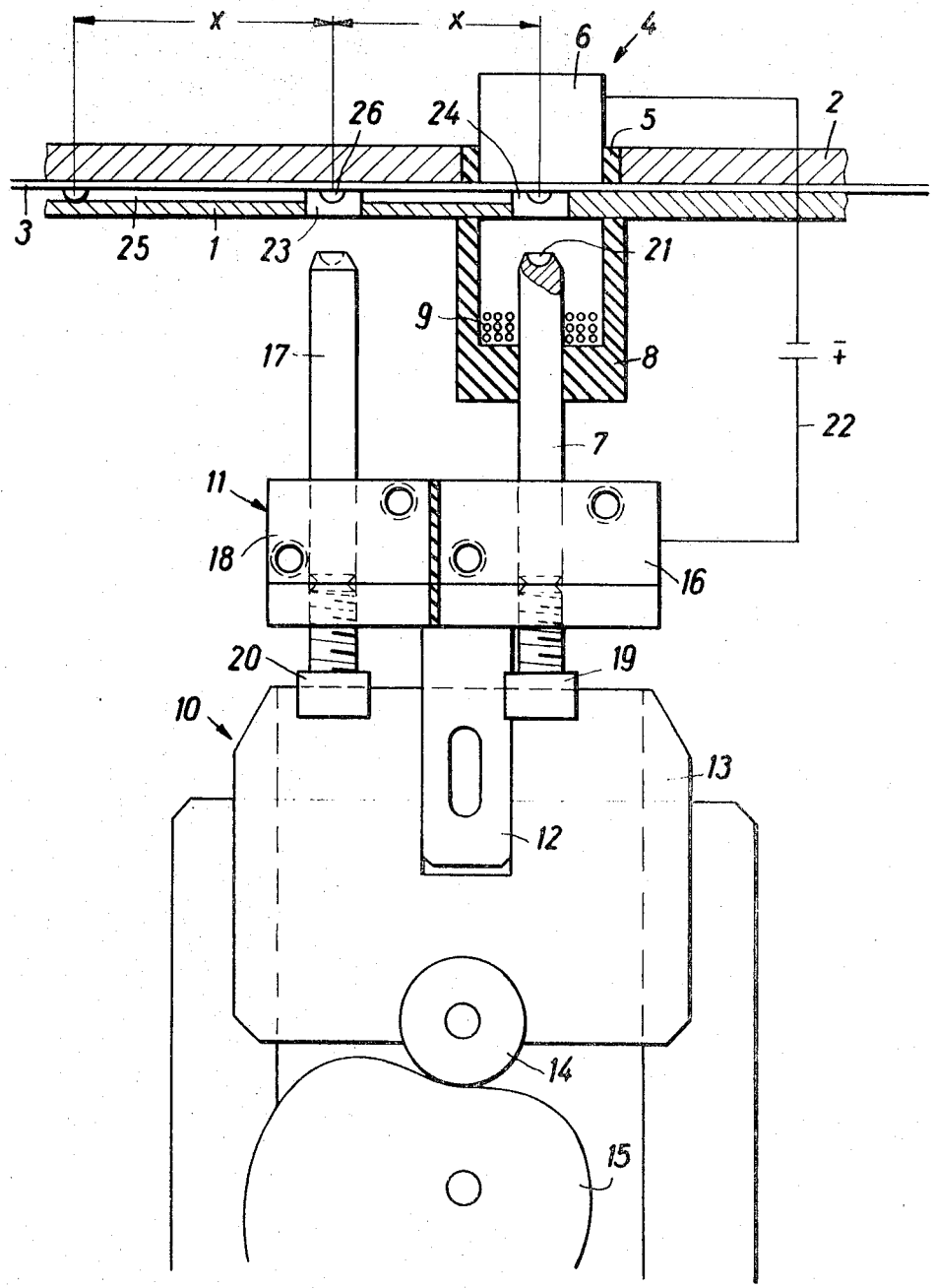

WELDING DEVICE FOR ELECTRIC CONTACT ELEMENTS

The invention relates to a welding device for feeding pellets to support material and welding the same thereon, wherein at least one pellet is fed to the support material from below by means of one feed electrode, pressing and welding the pellet onto the support material.

BACKGROUND OF THE INVENTION

A welding device of this design is known, wherein via a pellet magazine disposed above the support material at least one pellet is fed to a horizontally slidable feed electrode, said electrode being laterally displaced below the support material, and by welding the pellet onto the support material said electrode is pressed against the latter. Aside from the fact that said feed electrode necessitates a complicated control mechanism because of the required horizontal shifting coupled with the additional pressing on, such equipment has the disadvantage of having to provide a separate magazine with conformed pellet supply to the electrode for any other pellet size.

SUMMARY OF THE INVENTION

It is the object of the invention to provide a welding device of the type denoted in the introduction, wherein the exchange of the supply magazine is not required and the operation of the feed electrode is simplified.

Said object is solved in that the pellet magazine is disposed below the support material and the feed electrode in the said magazine can be lifted and lowered to below the filling level and is provided with at least one pellet uptake at its head end. With the said device the feed electrode is lowered to below the filling level of the magazine before each welding operation, causing one pellet to fall automatically into one or into each pellet uptake. Thereafter the electrode plus the pellet is lifted until abutting the support material and thereby the pellet is welded to the support material under simultaneous bearing pressure and under the action of preferably one stationary counterelectrode. The operation step according to the invention allows to apply the same feed magazine at all times for all pellet sizes by just using the electrode corresponding to each pellet size, said electrode to be provided with a very simple drive for the lifting and lowering mechanism, since merely vertical displacement is required.

According to a preferred embodiment the feed electrode is mounted adjustably on or resiliently supported in a bridge, said bridge to be lifted and lowered by means of a driving mechanism preferably designed as cam mechanism. Instead of the cam mechanism, hydraulic or pneumatic control may be effected. Electromagnetic service is likewise possible.

If the welding device as per the invention is to be provided with upsetting equipment, an upsetting die suitable to be exchanged is mounted on the bridge at an adjustable distance corresponding to the respective feed rate of the previously weld-on pellet. The distance of the upsetting die from the feed electrode may amount to a multiple of the unit feed of the support material which is preferably fed stepwise.

The pellet magazine is conveniently provided with a pellet supply wherein advantageously the pellet magazine may consist of transparent insulating material so that the filling stage or the filling level may also be controllable visually. In practice it was found that suitably the pellet magazine is to have a size, so as to enable the filling of at least three superposed pellet layers. Such a filling height will ensure that certainly at each electrode stroke the intended number of pellets is picked up by the pellet uptake or uptakes.

The invention is hereafter explained in more detail by means of a diagrammatic drawing, wherein:

BRIEF DESCRIPTION OF THE DRAWING

The FIGURE is showing an elevation and partly cut view of a welding device according to the invention.

DETAILED DESCRIPTION OF THE PREFERRED EMBODIMENT

Between one lower guide 1 and one upper guide 2 support material 3 is stepwise advanced from the left to the right side in the drawing and thereby passed across one welding device marked 4 throughout. The welding device 4 is equipped with one insulated counterelectrode 6, preferably stationary and provided with an insulation 5 against the upper guide 2, as well as one feed electrode 7 disposed below the lower guide 1 and cooperating with the said counterelectrode, the feed electrode 7 being vertically slidable within one pellet magazine 8. The pellet magazine 8 is positioned opposite the counterelectrode 6 and is filled by means of a pellet supply (not represented) with pellets 9, the amount of which is visually controllable in case the pellet magazine is of transparent design. The magazine is further consisting of insulating material so as to insulate the feed electrode against the lower guide.

A drive mechanism marked 10 throughout is provided for the vertical supply of the feed electrode 7. Subject mechanism has a bridge 11 connected via one bridge support 12 to one actuation slide 13 which is lifted and lowered via a cam follower 14 by a cam 15.

The feed electrode 7 is exchangeably clamped to the bridge 11 by means of one electrode-clamping plate 16 which is insulated against the bridge 11 and the support 12. In the event that the subject device, after the welding of the pellets onto the support material is at the same time to serve for the upsetting of the welded-on pellets, the bridge 11 will simultaneously serve as support for an upsetting die 17, arranged at a distance from the feed electrode corresponding to the respective feed rate x, and in case said distance is identical to the unit feed of the support material, said die will upset the pellet welded on in the preceding stroke of the feed electrode 7. The said distance may, of course, amount to a full multiple of the unit feed.

The feed electrode 7 as well as the upsetting die 17—for which one clamping plate 18 is likewise provided—may be adjusted in their height by means of setscrews 19 or 20.

It will be convenient to interpose a (nonrepresented) spring between the head end of the setscrew 19 and the corresponding bottom end of the feed electrode 7, so as to ensure the welding impuls becoming effective during the length of the bearing pressure acting.

The device is operating as follows: After advance of the support material 3—which may either be tape, wire or the like—by the feed rate x, the feed electrode 7 is lowered through the drive mechanism 10 to below the filling level of the pellets 9 in the magazine 8, whereby one pellet drops into each pellet uptake 21 of the feed electrode (to simplify matters, one pellet uptake only is represented). Thereafter the feed electrodes 7 plus the pellet taken up is lifted up to the support material 3 by means of the drive mechanism 10, thereby closing an electric circuit and releasing the welding operation. At the same time, the pellet welded on in the preceding cycle is upset by means of the upsetting die 17. For conveying the feed electrode 7 and the upsetting die 17 to the support material 3 respective recesses 23 and 24 are provided in the lower guide 1, which on its side facing the support material 3 is provided with a receiving slot 25 for the welded-on or upset contact spots 26.

The feed of the support material 3 and engaging the drive mechanism 10 are conveniently synchronized in such a way that the shortest possible working cycle is maintained. Thus the feed electrode may for instance be lowered and lifted while the support material is advanced, so that at the end of the advance motion the feed electrode is reaching its highest position.

According to the invention it is also feasible to provide a feed electrode having vertically to the drawing plane several pellet uptakes 21 disposed transversally to the advance direction in tandem alignment, and to give the upsetting die 17 a configuration conformed thereto. It is further possible to dispose several feed electrodes and upsetting dies in tandem alignment in the feed direction, which are actuated simultaneously, wherein the support material is advanced by an amount corresponding to the number of welded on contact spots. When using several individual feed electrodes one single magazine may be assigned to all of the feed electrodes, or else a separate magazine for each feed electrode may be provided.

The device as per the invention is particularly suitable to be connected in series as working device for bending machines in which the support material having contact spots are given terminal shaping as electric contact parts.

I claim:

1. An automatic welding device for electrically welding individual pellets to a continuous support material at a predetermined incremental distance along the support material comprising:

first welding electrode means;

feeding means to position the continuous support material below and against the first electrode means and to incrementally feed the continuous support material across said first electrode means by the predetermined incremental distance;

second electrode means positioned below said first electrode means, said second electrode means slidably mounted to permit vertical movement of said second electrode means from a lower limit of travel to an upper limit of travel;

uptake means positioned on an upwardly disposed portion of said second electrode means for receiving and holding one of the pellets; and magazine means for storing the pellets, said magazine means positioned around said second electrode means so that one of the pellets will be received into said uptake means when said second electrode means is at its lower limit of travel, whereby the pellet will be elevated by said second electrode means until said pellet contacts said support material at the upper limit of travel of said second electrode means thereby welding the pellet to the support material.

2. An automatic welding device as claimed in claim 1 wherein said second electrode means comprises:

a cylindrically shaped vertically aligned electrode member; and a mounting member, said mounting member adapted to adjustably and disengageably support said cylindrically shaped electrode member to permit adjustment and replacement of said cylindrically shaped electrode member, said mounting member slidably mounted to permit vertical movement of said mounting member and said cylindrically shaped electrode.

3. An automatic welding device, as claimed in claim 2, wherein said uptake means comprises a hollow recession in an upwardly disposed portion of said cylindrically shaped electrode.

4. An automatic welding device, as claimed in claim 1, and further comprising;

power drive means in operable association with said second electrode means, said power drive means adapted to raise said second electrode means from its lower limit of travel to its upper limit of travel when said feeding means incrementally feeds an unwelded portion of the support material to a position immediately below said first electrode means and to return said second electrode means to its lower limit of travel when the pellet is welded to the support material.

5. An automatic welding device, as claimed in claim 2, comprising:

an upsetting die mounted to said mounting member, said upsetting die positioned in line with the line of travel of the support material at a distance from said cylindrically shaped electrode member equal to the incremental distance, whereby said upsetting die is moved upwardly to upset the previously welded pellet on the support material when said mounting member is moved upwardly.

6. An automatic welding device, as claimed in claim 1, comprising a supply means to replenish the pellets in said magazine means.

7. An automatic welding device, as claimed in claim 1, wherein said magazine means is fabricated from a transparent material.

* * * * *